United States Patent [19]

Lilley

[11] Patent Number: 4,912,550
[45] Date of Patent: Mar. 27, 1990

[54] COMPOSITE SYNC COLOR FRAME ENCODER AND DECODER

[75] Inventor: Martin A. Lilley, Fremont, Calif.

[73] Assignee: AMPEX Corporation, Redwood City, Calif.

[21] Appl. No.: 239,147

[22] Filed: Aug. 31, 1988

[51] Int. Cl.⁴ .............................. H04N 9/44
[52] U.S. Cl. ..................................... 358/17
[58] Field of Search .................. 358/17, 19, 148

[56] References Cited

U.S. PATENT DOCUMENTS

| | | | |
|---|---|---|---|
| 2,664,463 | 12/1953 | Parker | 358/17 |
| 2,676,201 | 4/1954 | Cole | 358/17 |
| 4,007,486 | 2/1977 | Inaba et al. | 358/19 |

OTHER PUBLICATIONS

"American National Standard for Television-Time and Control Code-Video and Audio Tape for 525-Line/60-Field Systems", Sponsor: Society of Motion Picture and Television Engineers, dated Jan. 29, 1986.

Primary Examiner—John W. Shepperd
Attorney, Agent, or Firm—Robert E. Krebs; George B. Almeida; Joel D. Talcott

[57] ABSTRACT

A method and system for encoding color frame polarity information into composite sync signals. Also, a method and system for detecting color frame polarity information which has been encoded into composite sync signals and for restoring the encoded composite sync into its normal non-encoded form.

24 Claims, 3 Drawing Sheets

COMPOSITE SYNC COLOR FRAME ENCODER AND DECODER

BACKGROUND OF THE INVENTION

1. Field of the Invention

The present invention generally relates to the processing of television signals and, more particularly, to the processing of color television signals.

2. State of the Art

Generally speaking, television pictures are comprised of snapshot-like "frames" containing video data organized in horizontal lines by synchronizing signals in a manner suitable for reproduction at receivers. For example, according to the standards of the National Television Systems Committee (NTSC), each frame of video information comprises 525 horizontal scanning lines and the frame repetition rate is thirty frames per second. (Thus, the horizontal scanning line repetition rate within an NTSC frame is 15,750 lines per second and the duration of each horizontal scanning line is 63.5 microseconds.)

In practice, complete frames of video information are not reproduced at a receiver in a single cycle. Instead, to reduce flicker, a technique known as interlaced scanning is used. According to this technique, each complete frame of video information is divided into two interlaced fields, each comprising a sequence of the odd numbered or even numbered horizontal scanning lines. Thus, if the horizontal scanning lines of a 525-line NTSC frame were numbered sequentially from the top of a raster array, an odd-line field would comprise numbered lines 1, 3, 5, and so forth through frame line 525, and an even-line field would include numbered lines 2, 4, and so forth through frame line 524. For the NTSC format, the field repetition rate is sixty fields per second while the scanning line repetition rate remains at 15,750 lines per second. In practice, line numbers are based upon the publication "Recommendations and Reports of the CCIR", 1986, Vol. XI - Part 1, Rep. 624-3, pages 22-24.

The synchronizing signals that organize video information for reproduction are normally referred to as composite sync. In practice, composite sync includes vertical sync pulses which define the beginning of each video field and horizontal sync pulses which define the beginning of each horizontal line in a field. Also, the composite sync includes pre-equalizing signals.

In color television systems, each horizontal scanning line carries a sinusoidal synchronizing signal referred to as a color burst. In the NTSC standard, for example, each color burst has a frequency of about 3.58 megahertz. Color burst signals determine the color phase, or picture hue, of signals that follow the burst in the horizontal scanning line. The relationships between the frequency of the chrominance subcarrier (Fsc) and the horizontal scanning line frequency (Fh) for the NTSC, PAL-M, and PAL standards are as follows:

$$NTSC: \quad Fsc = (455/2)Fh$$
$$PAL\text{-}M: \quad Fsc = (909/4)Fh$$
$$PAL: \quad Fsc = \{(1135/4) + (1/625)\}Fh$$

Thus, for the 525-line NTSC system, there are 227.5 cycles of the subcarrier per horizontal scanning line and, since there are an odd number of horizontal scanning lines (i.e., 525) per an NTSC television frame, exact matching of subcarrier-to-horizontal (SC-H) timing relationship occurs after 1050 horizontal scanning lines or, equivalently, two television frames. In the 525-line PAL-M standard, there are 227.25 cycles of subcarrier per horizontal scanning line and 525 horizontal scanning lines per television frame. Accordingly, exact matching of the SC-H phase relationship for the PAL-M standard occurs after 2100 horizontal scanning lines or, equivalently, four television frames or eight fields. In the 625-line PAL standard, there are 283.7516 cycles of subcarrier per horizontal scanning line and 625 horizontal scanning lines per field. Thus, exact SC-H matching for the PAL standard occurs after 2500 horizontal scanning lines or, equivalently, four television frames or eight fields.

For television signals of the analog type, it is conventional to derive color frame identification information by measurement of the SC-H timing relationship. When making such measurements, the leading-edge of a horizontal sync signal is compared with color burst extrapolated back to the horizontal sync signal. Because such measurements depend upon calibration of signal generation and measuring equipment and are subject to transmission path distortions, complex measurement circuits are required and, even then, the measurements are sometimes ambiguous.

Color frame identification information is needed for various purposes. For example, when a videotape record and playback machine is used to edit color television information as by inserting frames from one recorded television program into another program, it is necessary to know the polarity of the color frames to achieve color coherence and to avoid horizontal picture shifts in edited pictures during playback. In typical editing suites, each video tape recorder has its own color frame detection circuit for making SC-H phase measurements. In practice, such measurements are often inconsistent in editing suites and color frame relationships between video tape recorders are random. Thus, for professional videotape editing and similar purposes, it would be desirable to provide easily accessible color frame polarity information without the need to repeatedly detect color frame polarity by SC-H phase measuring devices.

SUMMARY OF THE INVENTION

The present invention satisfies the above-described need by providing a system for encoding and decoding color polarity information from composite sync signals. More particularly, the present invention allows SC-H measurements to be done only once and then provides that the color frame polarity information is encoded into a commonly used signal, i.e., composite sync. After encoding, the color frame polarity information can be transferred to other locations without additional cables. Furthermore, the encoded color frame polarity information is non-ambiguous, since it represents only one reference video SC-H measurement.

The encoding method of the present invention generally comprises the steps of selecting pre-equalizing pulses within composite sync signals on selected lines within color television fields and then providing color polarity coding pulses to modify the selected pre-equalizing pulses to identify color television fields having a selected color frame polarity. Preferably, each color polarity coding pulse has a duration of about one microsecond and is timed to begin after the beginning of the selected pre-equalizing pulse and to terminate before the end of the selected pre-equalizing pulse. In the NTSC format, the selected line is preferably the 263rd line.

To carry out the encoding method of the invention, a system can comprise:

means for providing line-identifying pulses that identify particular horizontal lines containing composite sync signals within a frame of color video information;

means to receive the line-identifying pulses and for providing color polarity coding pulses at selected locations within the identified lines; and modifier means connected for receiving the color polarity coding pulses and the composite sync signals and operative to modify the composite sync signals on the identified lines with the color polarity coding pulses to indicate frame color polarity.

A method for detecting color frame polarity information which is encoded within pre-equalizing pulses in composite sync signals preferably comprises the steps of:

generating pulses which coincide with the leading edges of pre-equalizing pulses and which each have durations greater than about one-half the duration of the pre-equalizing pulse;

providing the generated pulses to the input of a data transfer device;

providing inverted composite sync signals to the data transfer device; and transferring the input of the data transfer device to output only when the data transfer device receives a pre-equalizing pulse encoded with color frame polarity information, thereby signifying the color frame polarity of a field of video information containing the modified pre-equalizing pulse.

DETAILED DESCRIPTION OF THE PREFERRED EMBODIMENT

Figure 1:
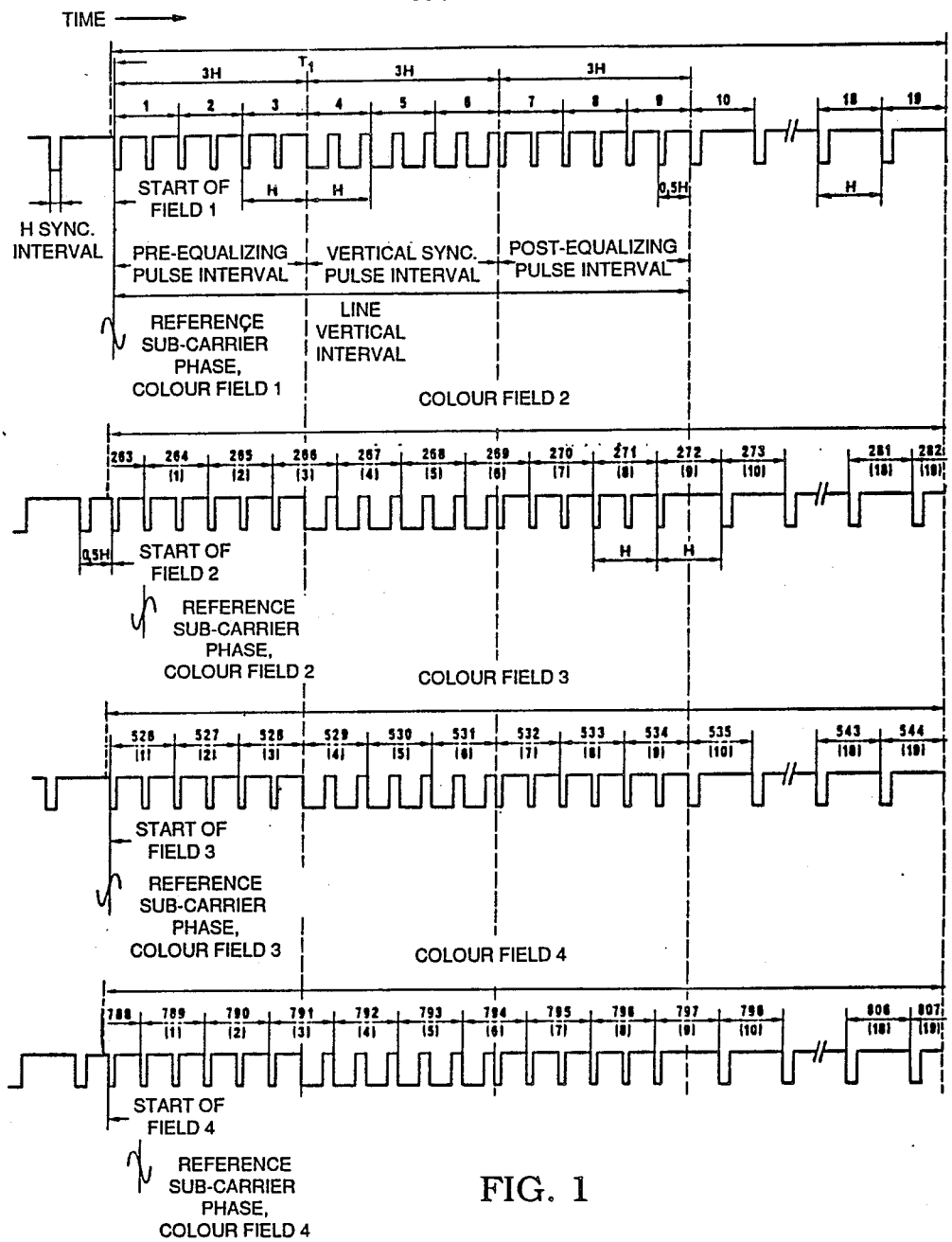
FIG. 1 shows selected segments of composite synchronizing signals.

Referring now to FIG. 1, there are shown ordered sequences of composite synchronizing signals such as would be associated with NTSC television signals over four consecutive fields. Starting at the left in the uppermost line of sync signals, six negative-polarity pre-equalizing pulses are spaced at half-line intervals for a total period of three horizontal lines. Normally, the pre-equalizing pulses each have a duration of about 2.3 microseconds. Following the sequence of pre-equalizing pulses are six broad pulses and then a sequence of post-equalizing pulses.

The pulse sequences shown in FIG. 1 can be understood to be taken from NTSC or PAL-M fields of television signals. Thus, the first pre-equalizing pulse in the uppermost line of composite sync is displaced a distance "H" away from the preceding horizontal sync pulse while, in the next lower line of composite sync signals, the first pre-equalizing pulse is displaced a distance H/2 away. The distance H is equivalent to the length of one horizontal scanning line. The half-line displacement is a characteristic that distinguishes even fields from odd fields.

Figure 2:
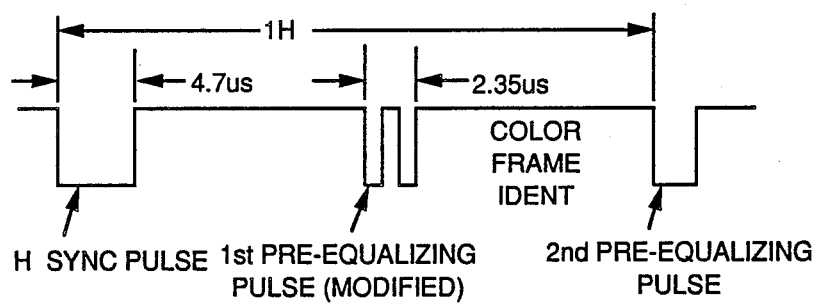
FIG. 2 shows a pre-equalizing pulse modified in accordance with the present invention.

FIG. 2 shows a portion of the pulse sequence in the second line of composite sync signals in FIG. 1 modified to encode color frame polarity information. More particularly, the first pre-equalizing pulse in FIG. 2 is modified to become two pulses such that the leading edge of the first pulse and the trailing edge of the second pulse coincide with the leading and trailing edges, respectively, of the original pre-equalizing pulse. In the preferred embodiment, as will be described in detail below, encoding is accomplished by inserting a pulse of approximately one microsecond duration in the selected pre-equalizing pulse.

The presence of a modified pre-equalizing pulse in one field of a television frame can now be understood to signify that the color phase of the frame has a certain polarity, say positive; conversely, the absence of a modified pre-equalizing pulse in a television frame signifies that the frame has the opposite color polarity. In the preferred embodiment, the modified pre-equalizing pulse is the first pre-equalizing pulse in a selected horizontal scanning line in a field of a frame; for example, the modified pre-equalizing pulse can be in a selected horizontal scanning line in either field 2 or field 4 in the NTSC format, or in a selected horizontal scanning line in field 1 or 3 in the PAL and PAL-M formats.

Figure 3:
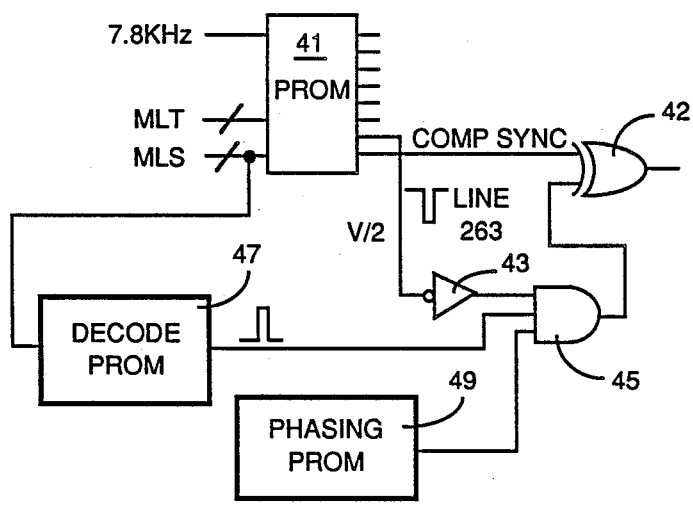
FIG. 3 is a functional diagram of a system according to the present invention for encoding color frame polarity information.

FIG. 3 shows a system for encoding color frame polarity information into pre-equalizing pulses at selected positions in color frames. In practice, the encoding system is integrated into a conventional sync generator and, consequently, has available the signals normally present in the sync generator. Accordingly, the system in FIG. 3 shows a conventional PROM 41 (programmable read only memory) which has inputs MLT (main line type) and MLS (main line segment). One output of PROM 41 is composite sync, which is provided to an exclusive-OR gate 42. Another output of PROM 41 is a pulse, called a gating pulse, which is at the V/2 rate and which is provided to an inverter 43 and then to an AND-gate 45. The AND-gate 45 also receives input pulses from a line segment decoding PROM 47 and from a phasing PROM 49. Both PROMS 47 and 49 are conventional components of sync generators. The output of AND-gate 45 provides a second input to exclusive-OR gate 42.

In operation of the system of FIG. 3, the MLT and MLS inputs to PROM 41 provide, respectively, line type and line segment information. Table 1 shows examples of typical line type assignments for the NTSC standard. It should be noted that line type 4 occurs only at line 263 in an NTSC frame.

TABLE 1

| Frame Line Number | NTSC Line-Type |
| --- | --- |
| 001–003 | 03 |
| 004–006 | 01 |
| 007–009 | 03 |
| 010–021 | 08 |
| 022–262 | 09 |
| 263 | 04 |

TABLE 1-continued

| Frame Line Number | NTSC Line-Type |
|---|---|
| 264, 265 | 03 |
| 266 | 00 |
| 267, 268 | 01 |
| 269 | 02 |
| 270, 271 | 03 |
| 272 | 06 |
| 273–283 | 08 |
| 284 | 10 |
| 285–525 | 09 |

Based upon the light line type and segment information received by PROM 41, in FIG. 3, the PROM provides gating pulses that originate at a preselected line in a frame. Preferably, when operating in the NTSC format, PROM 41 provides a gating pulse at the 263rd line of each frame. Those gating pulses can be called line identifying pulses.

Further in operation of the system of FIG. 3, the pulses generated by line segment decoding PROM 47 are short-duration pulses, referred to herein as "mid-H" pulses, which are generated in response to the MLS signals. In practice, the mid-H pulses are timed to appear once on each horizontal line, midway along the line. More particularly, the mid-H pulses each have a duration of about one microsecond and are generated at appropriate times to begin and end within the period of a pre-equalizing pulse, if any, appearing midway along a horizontal line. In the system of FIG. 3, the mid-H pulses are provided to AND-gate 45 which, further, receives a 7.8 KHZ (NTSC) or 3.9 KHZ (PAL) signal from phasing PROM 49. The input from phasing PROM 49 allows the mid-H pulses to be selected for insertion on a selected color frame.

In operation, AND-gate 45 in FIG. 3 outputs a pulse only when all three of its inputs are high. Under the operating conditions described above, for example, all three inputs to AND-gate 45 are high only when a mid-H pulse appears approximately within the middle of the first pre-equalizing pulse on the 263rd line of an NTSC frame of selected color polarity. The pulses provided by AND-gate 45 under such circumstances have the same duration as the mid-H pulses and can be called color polarity coding pulses.

Exclusive-OR gate 42 in FIG. 3 receives both the color polarity coding pulses and the composite sync and, therefore, outputs composite sync which is unaltered except when a color polarity coding pulse is received from AND-gate 45. In other words, the output of exclusive OR-gate 42 is identical to composite sync except that a selected pre-equalizing pulse is modified on a predetermined horizontal scanning line in frames of a selected polarity to, thereby, code the polarity of the selected color frames into the composite sync. After encoding, the color frame polarity information can be transferred to other locations in a recording suite without additional cables. Furthermore, the transferred encoded color frame polarity information is non-ambiguous, since it represents only one reference video SC-H measurement.

Figure 4:
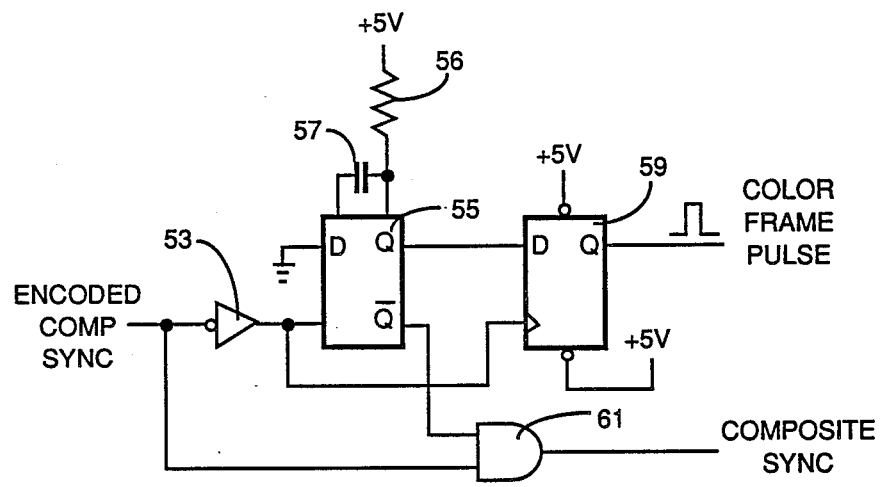
FIG. 4 is a functional diagram of one embodiment of a system according to the present invention for decoding color frame polarity information.

FIG. 4 shows an example of a system for detecting encoded color frame polarity information in composite sync signals. In particular, the system of FIG. 4 includes an inverter 53, a monostable multivibrator 55, and a D flip-flop 59. Monostable multivibrator 55 also includes a timing resistor 56 and a capacitor 57. Both monostable multivibrator 55 and flip-flop 59 are connected to inverter 53 to receive inverted encoded composite sync signals. The data input of flip-flop 59 is connected to receive the Q output of monostable multivibrator 55.

In operation of the system of FIG. 4, positive-going edges of inverted composite sync signals trigger monostable multivibrator 55. Then, the Q output of multivibrator 55 provides the data input of D flip-flop 59. By proper selection of timing resistor 56 and capacitor 57, each Q output pulse from multivibrator 55 has a duration which exceeds the duration of the encoded color frame polarity pulse but is less than the duration of a pre-equalizing pulse. Thus, there is no change in the Q output of multivibrator 55 when it receives color polarity coding pulses. The color polarity coding pulses do, however, clock flip-flop 59. As a result, flip-flop 59 provides a positive output when a color polarity coding pulse occurs within the interval of a pre-equalizing pulse. Since the output of flip-flop 59 is otherwise zero, a positive output from flip-flop 59 signifies occurrence of a color polarity coding pulse and, hence, indicates color frame polarity decoded from composite sync signals. Then, when flip-flop 59 receives the next pre-equalizing pulse, the flip-flop 59 is clocked low; therefore, the duration of the color frame pulse is slightly less than ½H.

In the illustrated embodiment, the system of FIG. 4 also functions to eliminate color frame polarity coding information from composite sync signals. For this purpose, an AND-gate 61 is connected to receive both the $\overline{Q}$ output of monostable multivibrator 55 and non-inverted composite sync signals. To understand operation of this portion of the circuit of FIG. 4, it should be noted that the duration of each of the $\overline{Q}$ output pulses from monostable multivibrator 55 exceeds the duration of each of the encoded color frame polarity pulses but is less than the duration of each of the pre-equalizing pulses. Thus, when a color polarity coding pulse occurs within the interval of a first pre-equalizing pulse at the input of AND-gate 61, the $\overline{Q}$ output of multivibrator 55 remains low even though the logic level of the composite sync signal goes high. Thus, AND-gate 61 outputs composite sync unaltered by the coding pulses.

Figure 5:
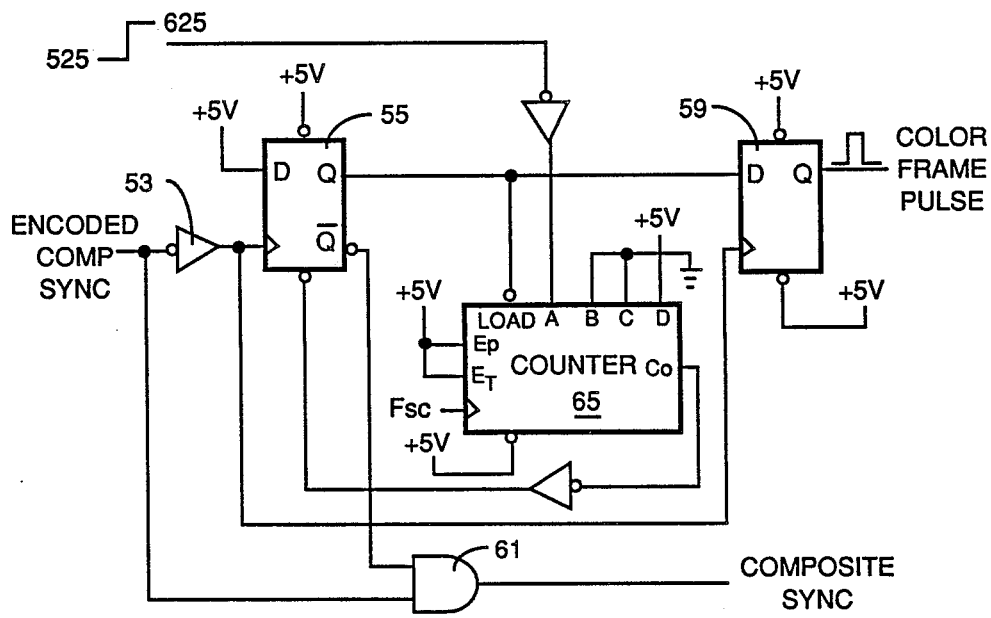
FIG. 5 is a functional diagram of yet another embodiment of a system according to the present invention for decoding color frame polarity information.

The decoding system in FIG. 5 is substantially similar to the system in FIG. 4 except for the inclusion of a high-speed digital counter 65 having its output connected to the enable-disable input of multivibrator 55. In practice, counter 65 eliminates the need for the timing resistor 56 and capacitor 57 of FIG. 4. Thus, counter 65 increases the accuracy of multivibrator 55 and allows the circuit to be readily implemented as a gate array.

Although the present invention has been described in its preferred embodiment, those skilled in the art will appreciate that additions, modifications, substitutions and deletions not specifically described in the preferred embodiment may be made without departing from the spirit and scope of the invention as defined in the appended claims.

What is claimed is:

1. A method for encoding color frame polarity information into composite sync signals comprising:
   selecting a pre-equalizing pulse within a composite sync signal;
   providing a color polarity coding pulse to modify the selected pre-equalizing pulse to identify color television fields having a selected color frame polarity.

2. A method according to claim 1 wherein the selected pre-equalizing pulse is on a selected line within color television fields.

3. A method according to claim 2 wherein the selected line is identified by generating a gating signal that originates substantially simultaneously with the beginning of the selected line.

4. A method according to claim 3 wherein said color polarity coding pulse is timed to begin after the beginning of the selected pre-equalizing pulse and to terminate before the end of the selected pre-equalizing pulse.

5. A method according to claim 4 wherein said color polarity coding pulse has duration of about one microsecond.

6. A method according to claim 2 wherein, in the NTSC format, the selected line is the 263rd line.

7. A method according to claim 1 wherein the selected pre-equalizing pulse is the first pre-equalizing pulse within a segment of the composite sync signal.

8. A method for encoding color frame polarity information into composite sync signals comprising:
   selecting certain pre-equalizing pulses within composite sync signals on selected lines within color television fields;
   providing color polarity coding pulses which begin after the beginning of each of the selected pre-equalizing pulses and terminate before the end of each of the selected pre-equalizing pulses;
   modifying the selected pre-equalizing pulses with the color polarity coding pulses to identify color television frames having a selected color polarity.

9. A method according to claim 8 wherein the selected line is identified by generating a gating signal that originates substantially simultaneously with the beginning of the selected line.

10. A method according to claim 8 wherein said color polarity coding pulse has duration of about one microsecond.

11. A method according to claim 8 wherein, in the NTSC format, the selected line is the 263rd line.

12. A method according to claim 8 wherein the selected pre-equalizing pulse is the first pre-equalizing pulse within a segment of the composite sync signal.

13. A system for encoding color frame polarity information into composite sync signals comprising:
   means for providing line-identifying pulses that identify particular horizontal lines containing composite sync signals within a frame of color video information;
   means that receive the line-identifying pulses and that generate color polarity coding pulses at selected locations within the identified lines after the beginning of a selected pre-equalizing pulse and that terminate each of the color polarity coding pulses before the end of the selected pre-equalizing pulse; and
   modifier means that receive the color polarity coding pulses and composite sync signals and that operate to modify the composite sync signals on the identified lines with the color polarity coding pulses to indicate frame color polarity.

14. A system according to claim 13 wherein the means for providing line-identifying pulses generates signals that originate substantially simultaneously with the beginning of selected lines.

15. A method for detecting color frame polarity information which is encoded within pre-equalizing pulses in composite sync signals, comprising the steps of:
   generating pulses which coincide with the leading edges of pre-equalizing pulses and which each have durations greater than about one-half the duration of the pre-equalizing pulses;
   providing the generated pulses to the input of a data transfer device;
   providing inverted composite sync signals to the data transfer device; and
   transferring the input of the data transfer device to output only when the data transfer device receives a pre-equalizing pulse encoded with color frame polarity information, thereby signifying the color frame polarity of a field of video information containing the modified pre-equalizing pulse.

16. A system for detecting color frame polarity information which is encoded within pre-equalizing pulses in composite sync signals, comprising:
   first generating means for generating pulses which coincide with the leading edges of pre-equalizing pulses and which each have durations greater than about one-half the duration of a pre-equalizing pulse;
   a data transfer device for receiving the pulses from the first generating means and for receiving inverted composite sync signals, the data transfer device being operative to transfer its input to output only when it receives a pre-equalizing pulse encoded with color frame polarity information, thereby signifying the color frame polarity of a field of video information containing the modified pre-equalizing pulse.

17. A system according to claim 16 wherein the first generating means is a monostable multi-vibrator.

18. A system according to claim 17 wherein the data transfer device is a D-type flip-flop.

19. A system according to claim 18 wherein inverted sync is provided to the clocking input of the D-type flip-flop.

20. A system according to claim 19 wherein pulses from the first generating means are provided to the data transfer input of the D-type flip-flop.

21. A system according to claim 17 wherein the logic gate means is an AND-gate.

22. A system according to claim 16 wherein the first generating means is a monostable multi-vibrator.

23. A method for removing color frame polarity information which is encoded within pre-equalizing pulses in composite sync signals, comprising the steps of:
   generating pulses which coincide with the leading edges of pre-equalizing pulses and which each have durations greater than about one-half the duration of the pre-equalizing pulses;
   providing the generated pulses to the input of a logic gate;
   providing composite sync signals to the logic gate; and
   transferring the input of the logic to output except when the logic gate receives a pre-equalizing pulse encoded with color frame polarity information, thereby removing the encoded color frame polarity information from the composite sync.

24. A system for removing color frame polarity information which is encoded within pre-equalizing pulses in composite sync signals, comprising:

first generating means for generating pulses which conicide with the leading edges of pre-equalizing pulses and which each have durations greater than about one-half the duration of the pre-equalizing pulse;
logic gate means for receiving the pulses from the first generating means and for receiving composite sync signals, the logic gate means being operative to transfer its input to output except when it receives encoded color frame polarity information.

* * * * *